United States Patent
Ohde et al.

(10) Patent No.: US 9,277,160 B2
(45) Date of Patent: Mar. 1, 2016

(54) PROGRAM LISTING DISPLAY CONTROL APPARATUS, PROGRAM LISTING DISPLAY APPARATUS, AND PROGRAM LISTING DISPLAY CONTROL METHOD

(75) Inventors: Junya Ohde, Ibaraki (JP); Yumi Ito, Tokyo (JP)

(73) Assignee: Sony Corporation (JP)

( * ) Notice: Subject to any disclaimer, the term of this patent is extended or adjusted under 35 U.S.C. 154(b) by 620 days.

(21) Appl. No.: 12/462,165

(22) Filed: Jul. 30, 2009

(65) Prior Publication Data

US 2010/0031293 A1 Feb. 4, 2010

(30) Foreign Application Priority Data

Aug. 4, 2008 (JP) ................. P2008-201179

(51) Int. Cl.
*G06F 3/00* (2006.01)
*G06F 13/00* (2006.01)
*H04N 5/445* (2011.01)
*H04N 21/435* (2011.01)
*H04N 21/482* (2011.01)
(Continued)

(52) U.S. Cl.
CPC ............. *H04N 5/445* (2013.01); *H04N 21/435* (2013.01); *H04N 21/4312* (2013.01); *H04N 21/4622* (2013.01); *H04N 21/4821* (2013.01)

(58) Field of Classification Search
CPC ............ H04N 5/44543; H04N 21/482; H04N 21/4532; H04N 21/4622; H04N 21/84
USPC .................. 725/40–41, 43–52, 54, 56, 59, 61
See application file for complete search history.

(56) References Cited

U.S. PATENT DOCUMENTS 5,585,838 A * 12/1996 Lawler et al. .................... 725/54
5,815,145 A *  9/1998 Matthews, III ................. 725/41
(Continued)

FOREIGN PATENT DOCUMENTS

EP          1274234 A2      1/2003
EP          1580989 A1      9/2005
(Continued)

OTHER PUBLICATIONS

Office Action from Japanese Application No. 2008-201179, dated May 11, 2010.
(Continued)

*Primary Examiner* — Jason Salce
(74) *Attorney, Agent, or Firm* — Lerner, David, Littenberg, Krumholz & Mentlik, LLP

(57) ABSTRACT

Disclosed herein is a program listing display control apparatus including: a program listing picture storage block configured to store a program listing picture in which are disposed program time slots to which a plurality of broadcast programs are allocated; a display control block configured to control a display apparatus to display the program listing picture; a control information input block configured to input control information for controlling the acquisition of additional information to be added to the program listing picture; and an information acquisition block configured to acquire program identification information for identifying the programs to which the additional information is added and the additional information regarding the programs identified by the program identification information, on the basis of the control information input through the control information input block.

15 Claims, 9 Drawing Sheets

(51) Int. Cl.
*H04N 21/431* (2011.01)
*H04N 21/462* (2011.01)

(56) References Cited

U.S. PATENT DOCUMENTS

| | | | |
|---|---|---|---|
| 6,018,372 | A | 1/2000 | Etheredge |
| 6,025,837 | A * | 2/2000 | Matthews et al. ............. 715/721 |
| 6,532,589 | B1 | 3/2003 | Proehl et al. |
| 2002/0129366 | A1 | 9/2002 | Schein et al. |
| 2007/0192793 | A1* | 8/2007 | Song et al. ...................... 725/39 |
| 2009/0241145 | A1* | 9/2009 | Sharma ............................ 725/43 |
| 2009/0249418 | A1* | 10/2009 | Alastruey Gracia et al. . 725/114 |

FOREIGN PATENT DOCUMENTS

| | | |
|---|---|---|
| JP | 11284920 A | 10/1999 |
| JP | 2002-125169 A | 4/2002 |
| JP | 2003-032568 A | 1/2003 |
| JP | 2004320503 A | 11/2004 |
| JP | 2005278179 A | 10/2005 |
| JP | 2007104614 A | 4/2007 |

OTHER PUBLICATIONS

Office Action from Japanese Application No. 2008-201179, dated Nov. 30, 2010.
European Search Report, EP 09167088, mailed Sep. 28, 2009.

* cited by examiner

PROGRAM LISTING DISPLAY CONTROL APPARATUS, PROGRAM LISTING DISPLAY APPARATUS, AND PROGRAM LISTING DISPLAY CONTROL METHOD

CROSS-REFERENCE TO RELATED APPLICATION

The present application claims priority from Japanese Patent Application No. JP 2008-201179 filed in the Japanese Patent Office on Aug. 4, 2008, the entire content of which is incorporated herein by reference.

BACKGROUND OF THE INVENTION

1. Field of the Invention

The present invention relates to a program listing display control apparatus for causing a display apparatus to display a program listing of the programs of which the broadcast schedule is being managed; to a program listing display apparatus incorporating the display control apparatus; and to a program listing display control method.

2. Description of The Related Art

In TV broadcasting, the programs to be broadcast are generally scheduled in advance. Particularly in digital TV broadcasting, the broadcast schedule is broadcast in the form of an electronic program guide (EPG) as part of the broadcast signal.

The EPG is displayed ordinarily as an electronic program listing in a two-dimensional table format. The table is made up of two axes: a coordinate axis defined by broadcast times, and a channel axis defined by the channels determined by the frequencies at which broadcast waves are transmitted.

Where such a display method is in use, the above two-dimensional table needs to be scrolled if a user wants to search the broadcast schedule for a desired program to be broadcast several days hence. This can pose a problem preventing the user from searching for desired programs efficiently.

Given the above type of problem, Japanese Patent Laid-open No. 2003-32568 (hereinafter referred to as Patent Document 1) proposes a display apparatus that provides channel group tabs and time group tabs by which to change a plurality of two-dimensional maps to be displayed. The proposed display apparatus is supposed to eliminate the need for scrolling the screen and doing other related tasks so that the user may get the EPG of the desired program displayed with a limited number of operations in a short time period.

SUMMARY OF THE INVENTION

A display method included in Patent Document 1 is aimed at displaying all program information on a single screen. However, the use of time group tabs and channel group tabs is not suited for providing a bird's-eye-view of the entire program information over several days. The proposed method thus fails to reduce the workload to be done or the time to be spent in looking for the desired program.

Also, the display method described in Patent Document 1 presupposes the use by the user of the time group tabs and channel group tabs. That means it takes time for the user to find out the information about the desired program unless the user has prior knowledge of the channel of the program in question and its broadcast time.

The present invention has been made in view of the above circumstances and provides a program listing display control apparatus, a program listing display apparatus, and a program listing display control method for allowing the user easily to look for desired program information while commanding a bird's-eye-view of program information over an extended period of time (e.g., several days) on a single screen.

In carrying out the present invention and according to one embodiment thereof, there is provided a program listing display control apparatus including: a program listing picture storage block configured to store in two-dimensional coordinates a program listing picture in which are disposed program time slots to which a plurality of broadcast programs are allocated, the two-dimensional coordinates being defined by broadcast dates on which the broadcast programs are to be broadcast along one coordinate axis; a display control block configured to control a display apparatus to display the program listing picture stored in the program listing picture storage block; a control information input block configured to input control information for controlling the acquisition of additional information to be added to the program listing picture; and an information acquisition block configured to acquire program identification information for identifying the programs to which the additional information is added and the additional information regarding the programs identified by the program identification information, on the basis of the control information input through the control information input block. In the program listing display control apparatus, the display control block exercises control in such a manner that of the program time slots disposed in the program listing picture, those program time slots to which are allocated the programs identified by the program identification information acquired by the information acquisition block are supplemented with the additional information correspondingly so as to display on the display apparatus the program listing picture to which the additional information is added.

According to a further embodiment of the present invention, there is provided a program listing display control method including the steps of: controlling the display on a display apparatus of a program listing picture retrieved from a program listing picture storage block configured to store in two-dimensional coordinates the program listing picture in which are disposed program time slots to which a plurality of broadcast programs are allocated, the two-dimensional coordinates being defined by broadcast dates on which the broadcast programs are to be broadcast along one coordinate axis; inputting control information for controlling the acquisition of additional information to be added to the program listing picture; and acquiring program identification information for identifying the programs to which the additional information is added and the additional information regarding the programs identified by the program identification information, on the basis of the control information input in the control information inputting step. In the program listing display control method, the display controlling step exercises control in such a manner that of the program time slots disposed in the program listing picture, those program time slots to which are allocated the programs identified by the program identification information acquired by the information acquisition block are supplemented with the additional information correspondingly so as to display on the display apparatus the program listing picture to which the additional information is added.

According to the embodiments of the present invention, as outlined above, there is displayed in two-dimensional coordinates a program listing picture in which are disposed program time slots to which a plurality of broadcast programs are allocated, the two-dimensional coordinates being defined by broadcast dates on which the broadcast programs are to be broadcast along one coordinate axis. This allows the user to command a bird's-eye-view of program information over an extended time period on a single screen. Control is exercised so that instead of providing program information to all programs allocated to the program time slots over the extended time period, only those program time slots to which are allocated the programs identified by program identification information are furnished with additional information correspondingly for display on a display apparatus. This structure guarantees the bird's-eye visibility of program information while reducing the workload to be done and the time to be spent by the user searching for the desired program. In this manner, the invention envisages displaying a program listing which allows the user to find desired program information easily while retaining a bird's-eye-view of program information over a prolonged time period such as several days on a single screen.

BRIEF DESCRIPTION OF THE DRAWINGS

Further features and advantages of the present invention will become apparent upon a reading of the following description and appended drawings in which.

DETAILED DESCRIPTION OF THE PREFERRED EMBODIMENTS

The preferred embodiments of the present invention will now be described in detail by referring to the accompanying drawings.

Figure 1:
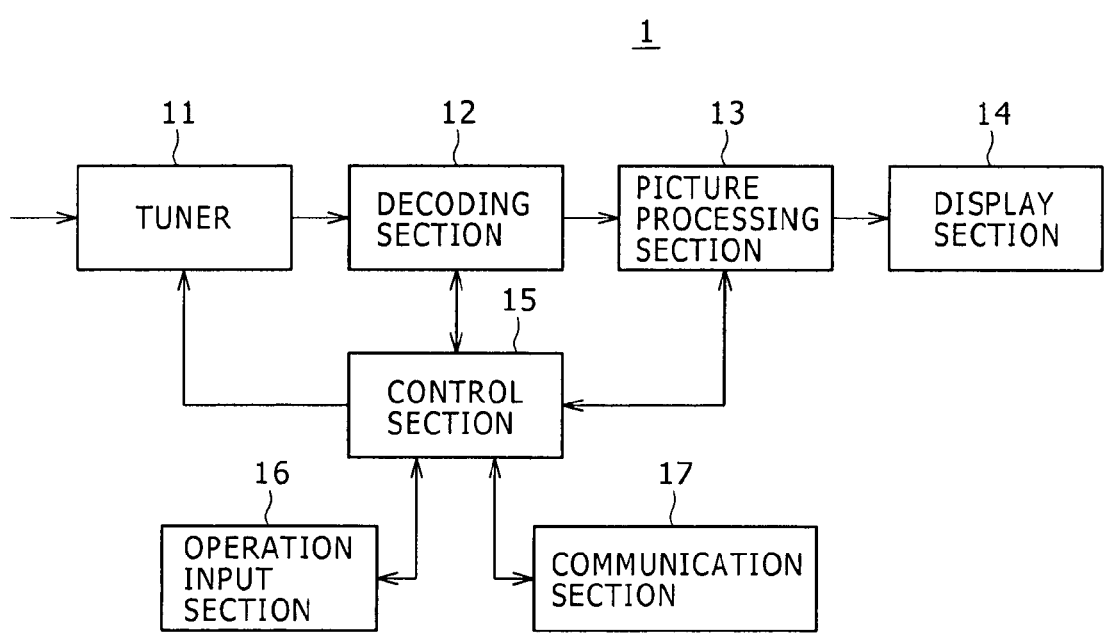
FIG. 1 is a block diagram showing a typical structure of a television receiver incorporating a display control apparatus to which an embodiment of the present invention is applied.

A program listing display control apparatus to which an embodiment of the present invention is applied is a device that exercises control so as to display a program listing of the broadcast programs scheduled to be broadcast under suitable management. Illustratively, the program listing display control apparatus may be incorporated in a television receiver 1 such as one shown in FIG. 1. In the description that follows, the television receiver 1 shown in FIG. 1 as the embodiment of the present invention will be used to explain the invention.

The television receiver 1 is a display apparatus that displays broadcast programs being broadcast on terrestrial or satellite broadcast waves received by an antenna. Specifically, the television receiver 1 is made up of a tuner 11 that demodulates the broadcast waves into a broadcast signal, a decoding section 12 that decodes the demodulated broadcast signal, a picture processing section 13 that performs picture processing on a decoded picture signal, a display section 14 that displays the picture signal having undergone the picture processing, and a control section 15 that controls these sections. The television receiver 1 further includes an operation input section 16 that admits input operations performed by the user, and a communication section 17 that conducts communications over telecommunication lines such as the Internet.

From the terrestrial or satellite broadcast waves received by the antenna, the tuner 11 performs channel selection in accordance with control commands from the control section 15 and carries out demodulation processing to extract the broadcast signal being broadcast on a specific physical channel. The tuner 11 then supplies the demodulated broadcast signal to the decoding section 12.

The decoding section 12 decodes the broadcast signal coming from the tuner 11 into a picture signal and broadcast data. The broadcast data separated by the decoding section 12 includes program information about the broadcast programs to be broadcast by the broadcast signal in question. Illustratively, the broadcast information describes the broadcast times, program titles, program types, cast, and content of the programs. The decoding section 12 feeds the picture signal to the picture processing section 13 and the broadcast data to the control section 15.

The picture processing section 13 converts the picture signal from the decoding section 12 into a picture signal that complies with the display format of the display section 14, and supplies the converted picture signal to the display section 14. The picture processing section 13 also converts a program listing picture from the control section 15, to be discussed later, into a picture signal complying with the display format of the display section 14 before supplying the converted picture signal to the display section 14.

The display section 14 displays the picture signal from the picture processing section 13 in a manner visible to the user.

The control section 15 is a microcomputer made up of an arithmetic processor and a memory. In keeping with operation commands issued by the user operating the operation input section 16 such as a remote controller, the control section 15 controls the workings of the diverse sections involved. For example, the control section 15 controls the above-mentioned sections in such a manner as to display on the display section 14 the broadcast program being broadcast by the broadcasting station selected by the user.

The operation input section 16 is a user interface through which the user operates the television receiver 1. Specifically, the operation input section 16 may be a remote controller that permits remote control operations. For example, the remote controller constituting the operation input section 16 is composed of a channel selection key for selecting the broadcast channel and color keys such as red, blue, green and yellow keys for use in displaying the program listing, as will be discussed later.

The communication section 17 conducts communications over bidirectional telecommunication lines such as the Internet in accordance with control commands from the control section 15. Alternatively, the communication section 17 may communicate with servers via lines that constitute dedicated lines and are not limited to the Internet.

Figure 2:
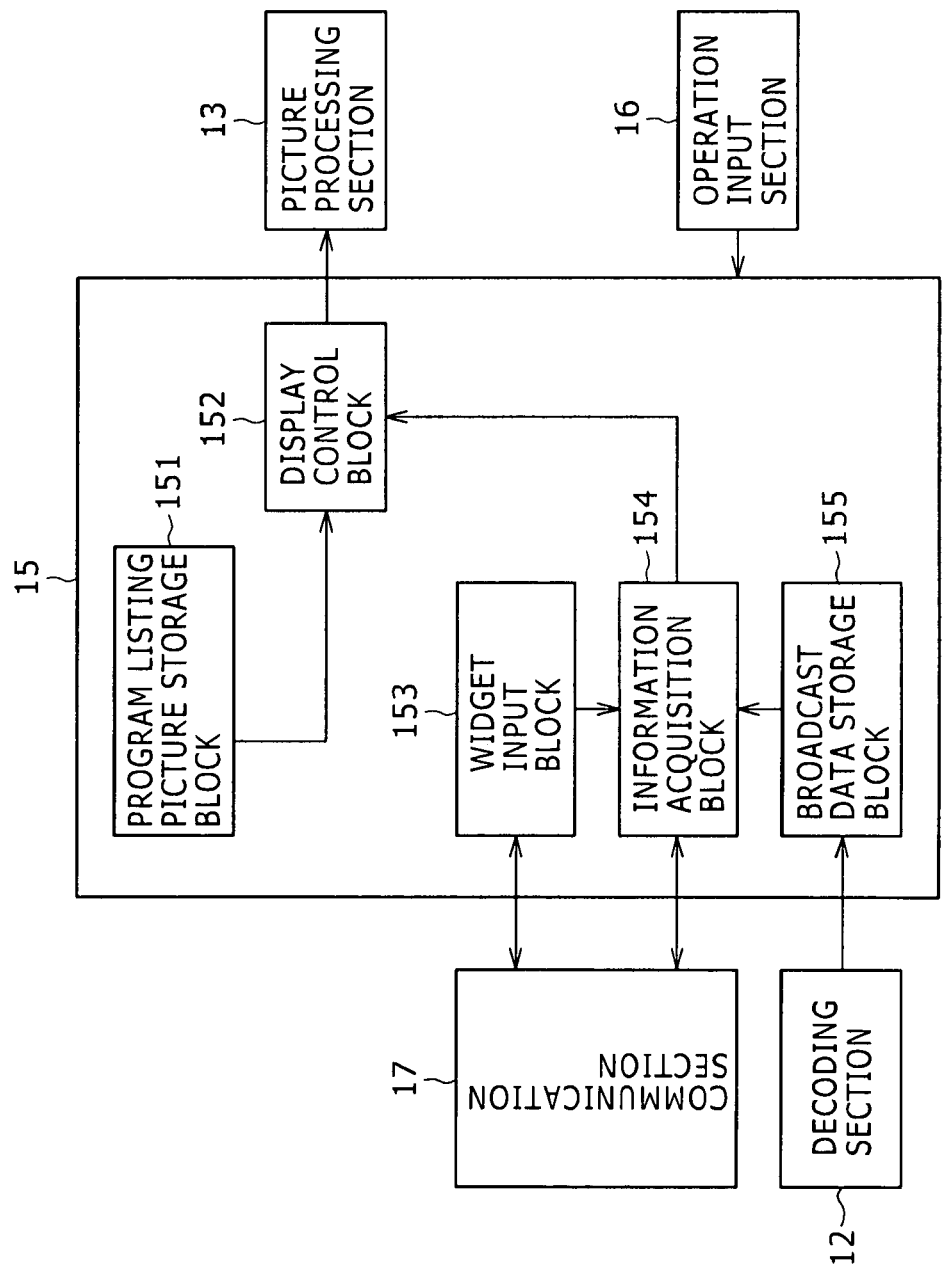
FIG. 2 is a block diagram showing a typical structure for exercising control so as to display a program listing picture.

In the television receiver 1 structured as described above, the control section 15 is constituted as shown in FIG. 2, in a manner enabling the television receiver 1 to let the user find desired program information easily while commanding a bird's-eye-view of program information over an extended time period on a single screen.

That is, as shown in FIG. 2, the control section 15 contains a program listing picture storage block 151 that stores a program listing picture in which program time slots are disposed in two-dimensional coordinates, and a display control block 152 that exercises control so as to display the program listing picture on the display section 14. The control section 15 also includes a widget input block 153 that acquires widgets as control information for controlling the acquisition of additional information to be added to the program listing picture, and an information acquisition block 154 that acquires information regarding the broadcast programs based on the widgets. The control section 15 further includes a broadcast data storage block 155 that stores the broadcast data contained in the broadcast signal.

The program listing picture storage block 151 stores the program listing picture in which are disposed program time slots to which a plurality of broadcast programs are allocated, the picture being stored in the two-dimensional coordinates defined by broadcast dates on which the broadcast programs are to be broadcast along one coordinate axis. Specifically, the program listing picture is constituted by picture data preinstalled in the television receiver 1. For example, the program listing picture is a picture that appears on the screen of the display section 14 when an operation command ordering the display of a program listing is input through the operation input section 16.

Also, the program listing picture is a picture in which a plurality of program time slots are disposed in the two-dimensional coordinates defined by two coordinate axes, one axis being representative of broadcast dates as mentioned above, the other axis being defined by the broadcast times at which the broadcast programs are to be broadcast.

The other coordinate axis mentioned above is not limited to being defined by the broadcast times; it may also be defined by broadcast channels to which broadcast programs are allocated based either on physical channels representing the broadcast frequencies of broadcast waves or on logical channels indicative of program types such as sports or dramas. The logical channels may be constituted not only by the above-mentioned program types but also by physical channels or genres which may be the favorites of specific users.

The display control block 152 exercises control so as to display on the display section 14 the program listing picture stored in the program listing picture storage block 151. The display control block 152 retrieves the program listing picture from the program listing picture storage block 151, adds information acquired by the information acquisition block 154 (to be discussed later) to the retrieved program listing picture, and supplies the picture processing section 13 with the picture data of the program listing picture supplemented by the added information.

Figure 3:
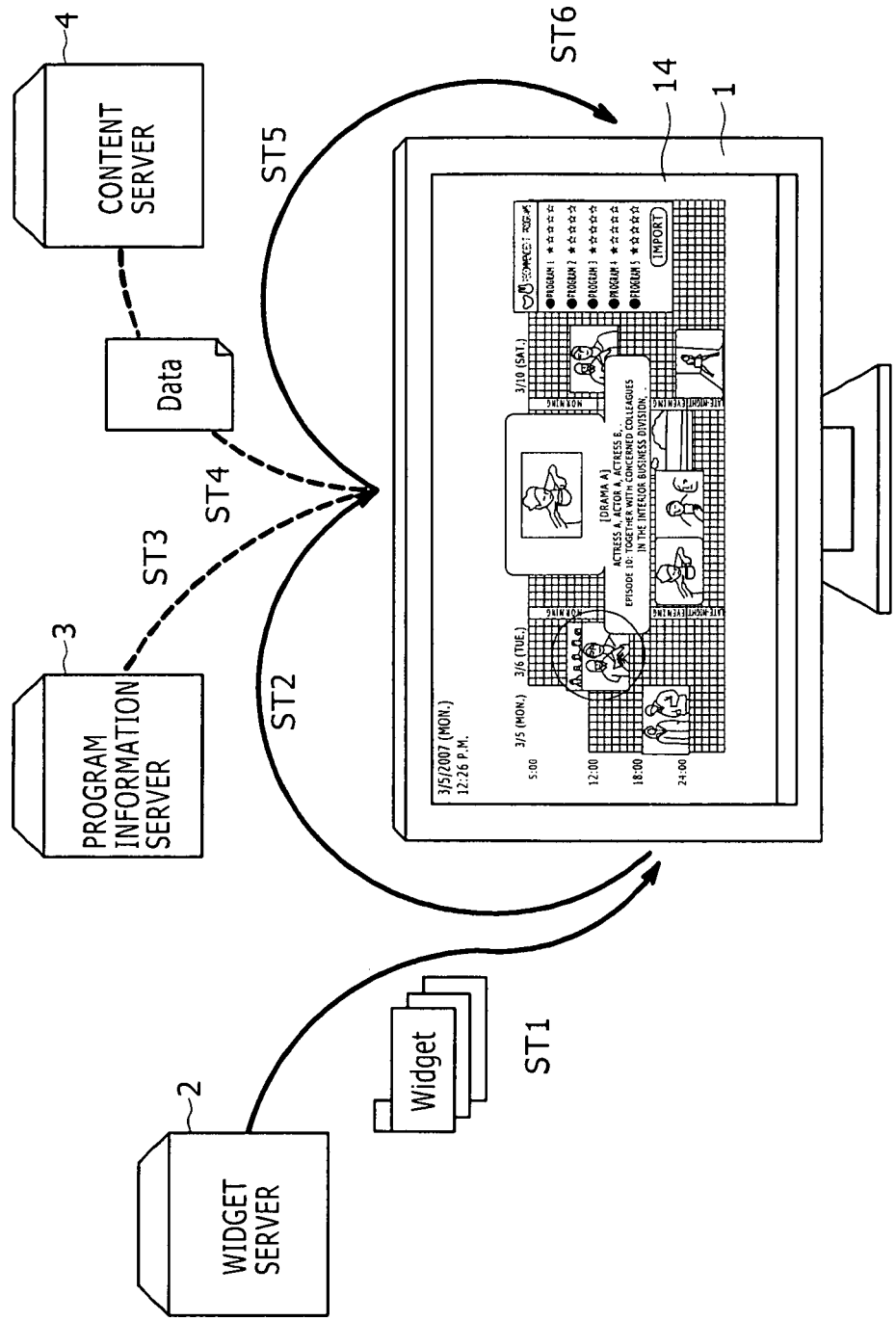
FIG. 3 is a schematic view showing typical steps performed by a control section for controlling the display of the program listing picture.

The widget input block 153 admits widgets as control information for controlling the acquisition of additional information to be added to the program listing picture stored in the program listing picture storage block 151. Specifically, as shown in FIG. 3, the widget input block 153 accesses an external widget server 2 through the communication section 17 in accordance with operation commands from the operation input section 16 (in step ST1), thereby causing the widgets to be input. The widget input block 153 then supplies the information acquisition block 154 with the widgets that were downloaded for input from the widget server 2 as mentioned above.

The information acquisition block 154 acquires program lists as program identification information for identifying the broadcast programs to be supplemented by additional information, on the basis of control information described in the widgets input by the widget input block 153. Specifically, as shown in FIG. 3, the information acquisition block 154 executes the widgets in accordance with the operation commands from the operation input section 16 (in step ST2), thereby acquiring an appropriate program list through access to an external program information server 3 via the communication section 17. The information acquisition block 154 may acquire various program lists based on diverse widgets. Specifically, the information acquisition block 154 can acquire program lists such as a list of programs recommended by broadcasting stations advertising their program offerings, a list of program ranking based on the viewing histories collected on the network, a list of programs shared with specific friends, and a list of programs recommended by celebrities. The widgets may be designed to exercise control so as to acquire from a content server a list of broadcast programs regarding the lists of favorite programs indicative of the preferred contents retained by network-based moving picture delivery services or the like.

Having acquired the program lists as described, the information acquisition block 154 obtains the content data regarding the programs denoted by the above-mentioned program lists through access to the content server 4 in accordance with the widgets executed by operation commands. In this context, the content data refers illustratively to picture information indicative of the scenes regarding programs as well as text data describing the content of programs.

The information acquisition block 154 is not limited functionally to acquiring additional information from the content server. Alternatively, the information acquisition block 154 may be structured to extract broadcast data from the broadcast data storage block 155 as the content data in accordance with widgets. That is, the information acquisition block 154 acquires information at least from either the content server or the broadcast data storage block 155 as the additional information in accordance with the widgets.

In the manner described above, the information acquisition block 154 acquires the program list and the content data and supplies the acquired data to the display control block 152 (in step ST5). In step ST6, the program list and content data are added to the program listing picture under control of the display control block 152 before being displayed on the display section 14 as will be shown later as display examples.

Also, when a plurality of widgets are input through the widget input block 153, the information acquisition block 154 may be structured to acquire the program list and content data based solely on the widget selected by the user from among the multiple widgets. In this manner, the control section 15 may download a plurality of widgets beforehand and acquire additional information based only on the widget for obtaining the information desired by the user, thereby reducing the amount of workload to be handled in communication processing and display control processing.

The control section 15 structured as discussed above exercises control in such a manner that of the program time slots disposed in the program listing picture, those program time slots to which the programs identified by the program list are allocated are supplemented by the corresponding content data. The program listing picture to which the additional information is added is then displayed on the display section 14.

How the control section 15 works will now be described in more detail by referring to some display examples of the program listing picture supplemented by additional information as discussed above and displayed visibly for the sake of the user.

Figure 4:
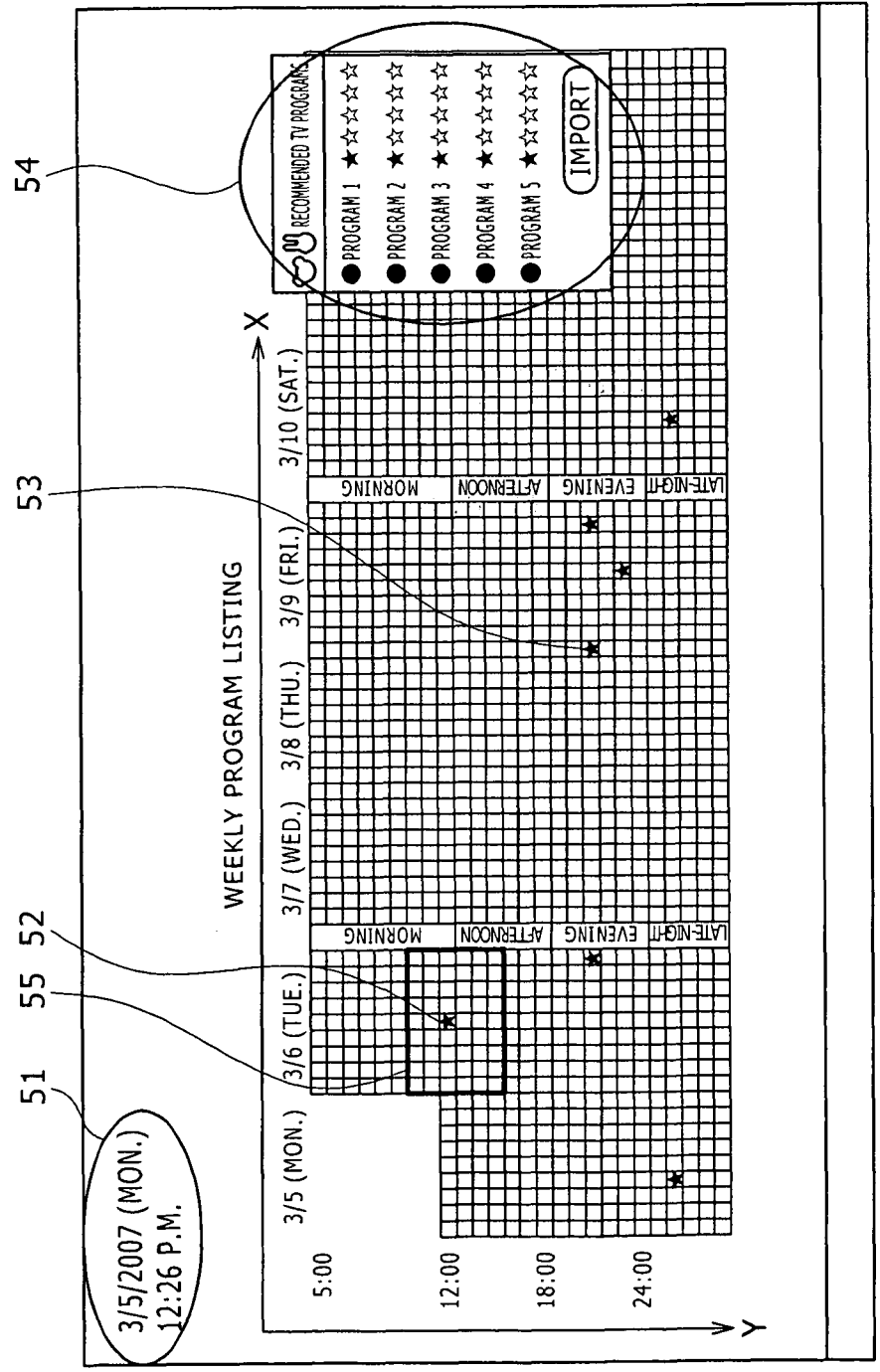
FIG. 4 is a schematic view showing a first display example of the program listing picture.
Figure 5:
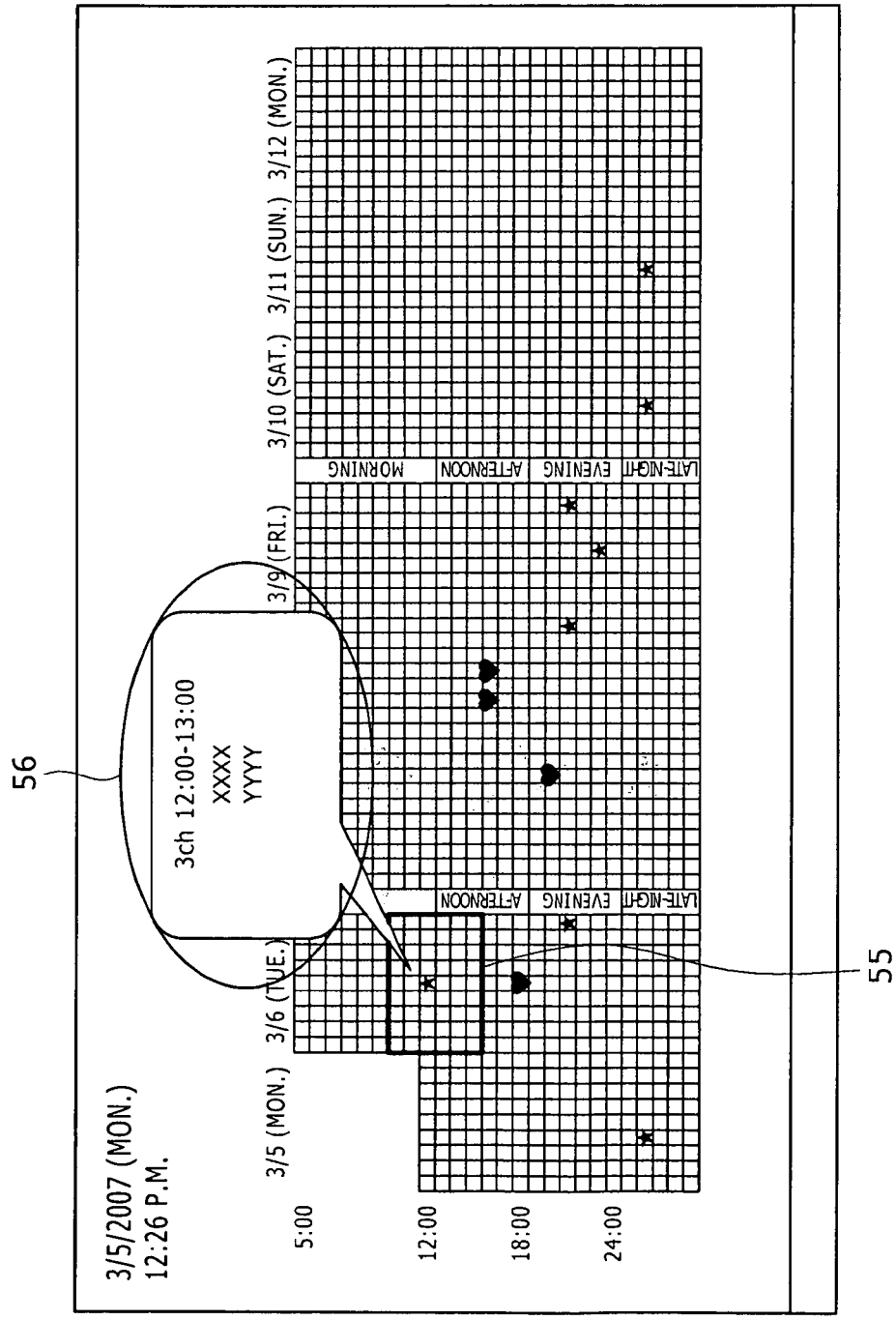
FIG. 5 is another schematic view showing the first display example of the program listing picture.

Referenced hereunder for describing the workings of the control section 15 is the first display example shown in FIGS. 4 and 5.

In the first display example, the display control block 152 retrieves the program listing picture from the program listing picture storage block 151 and displays the retrieved picture as a background picture. In order to display the schedule of the broadcast programs to be broadcast illustratively over eight days, as shown in FIG. 4, the program time slots are disposed on a two-dimensional plane defined by an X and a Y axis, the X axis representing a total of eight days of broadcasting in units of a day, the Y axis denoting a total of 24 hours in units of four hours. The program time slots disposed on this two-dimensional plane are each formed by a program listing that has a plurality of broadcast programs allocated thereto in two-dimensional coordinates defined by an X and a Y axis, the X axis representing physical channels, the Y axis denoting broadcast times. The program listing may be displayed in enlarged form in accordance with operations performed by the user, as will be discussed later.

To the program listing picture described above, the display control block 152 adds picture information as follows: the display control block 152 first adds time information 51 indicative of the current time. The display control block 152 also adds, say, an asterisk mark to each program time slot to which are allocated the broadcast programs indicated by the program list supplied from the information acquisition block 154, the asterisks being picture information visibly indicating the presence of the programs identified by the program list. If the asterisks are provided in a plurality of types as indicated by marks 52 and 53, the programs inside the program list may be further categorized by priority, by importance, or by some other standard for visible display. Also, the display control block 152 displays content information 54 about the programs making up the program list illustratively on the right side of the screen as shown in FIG. 4. The content information 54 here may be arranged to display the types of widgets along with the text data about the programs indicated in the program list.

Furthermore, the display control block 152 displays movably a cursor 55 on the screen for use in selecting a desired program time slot disposed in the program listing picture in accordance with the operation commands from the operation input section 16. When the cursor 55 is moved by the user's operations, the display control block 152 can position the cursor 55 to the program listing of the date and time desired by the user.

If a program identified by the program list is disposed in the program time slot selected with the cursor 55, the display control block 152 provides a pop-up display of the content information 56 added to that program in keeping with the movement of the cursor 55 as shown in FIG. 5. In this manner, the user can easily ascertain information about the program identified by the cursor 55 while commanding a bird's-eye-view of the program listing over an extended time period, using as a guide the marks attached to the broadcast programs extracted by the widgets. The display control block 152 can thus provide the user with an easy-to-understand display form indicating the types of the programs found in the broadcast time slot indicated by the cursor 55. The picture information given in a pop-up display may illustratively include the program title "XXXX," broadcast start time "12:00," broadcast end time "13:00," and physical channel number "Channel 3." In keeping with the user's operations, the display control block 152 also shifts the screen so as to give an at-a-glance display of a plurality of broadcast programs allocated to the broadcast time slot selected with the cursor 55, out of the program listing display extending for about a week. For example, on the screen after the shift, the display control block 152 gives an at-a-glance table of information about all broadcast programs allocated to the broadcast time slot selected with the cursor 55, on a two-dimensional plane with its X axis representing physical channels and its Y axis denoting broadcast times.

In the control section 15, the information acquisition block 154 may execute a plurality of widgets. Illustratively, two program lists may be acquired by execution of two widgets. In this case, as shown in FIG. 5, the display control block 152 may execute the two different widgets so as to indicate the coordinates of each of the programs in one of the two program lists using an asterisk mark icon while pointing to the coordinates of each of the programs in the other program list using a heart-shaped mark icon. In this manner, the display control block 152 may utilize icons of different marks to present the user visibly with the picture information corresponding to a plurality of program lists.

The workings of the control section 15 are further explained below in reference to the second display example shown in FIGS. 6 and 7. In the second display example, as in the first display example discussed above, the display control block 152 retrieves from the program listing picture storage block 151 the program listing picture in which are disposed program time slots on a two-dimensional plane with one axis representing broadcast dates and with the other axis denoting broadcast times, the retrieved program listing picture being displayed as a background picture.

In the second display example, as in the first, the display control block 152 displays icons each identifying the coordinates of each of the broadcast programs in a given program list while displaying in thumbnails the picture data regarding the broadcast programs corresponding to these icons. Here, the picture data regarding the broadcast programs corresponding to the icons is the content data acquired from the above-mentioned content server.

In accordance with the user's operations, the display control block 152 also exercises display control so as to move a cursor 61 between the picture data displayed in thumbnails on the screen. The display control block 152 displays detailed additional information about the picture data pointed to by the cursor 61 moved by the user's operations, the additional information being displayed illustratively as content information 62 shown at the center of FIG. 6. The content information 62 in the middle of FIG. 6 indicates picture data 62a, a program title (e.g., "Drama A"), the cast (e.g., "Actress A, actor A, actress B"), and content of the program, in a pop-up display corresponding to the picture data selected with the cursor 61 and displayed in a thumbnail.

Figure 6:
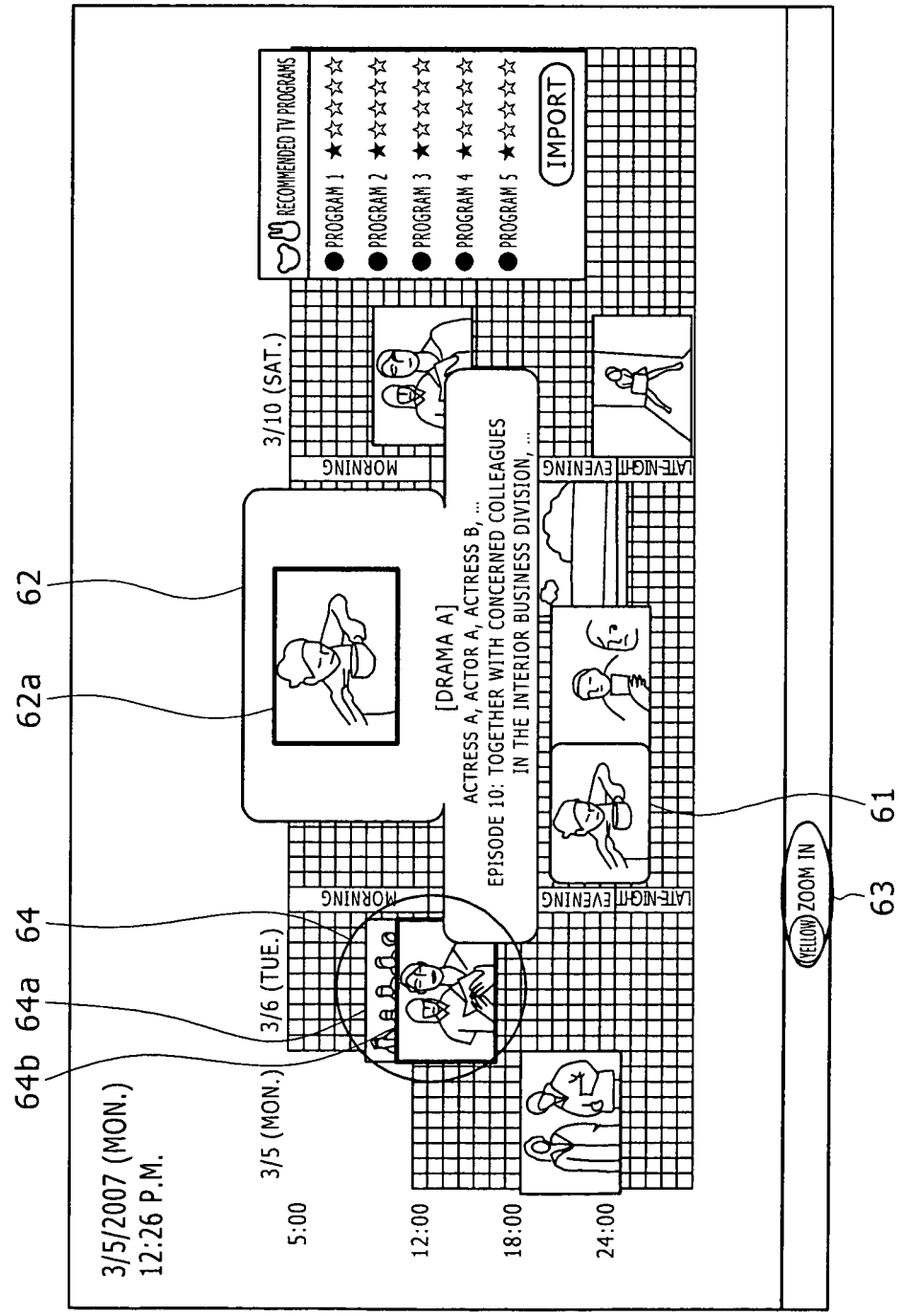
FIG. 6 is a schematic view showing a second display example of the program listing picture.

When the yellow color key displayed in a function display field 63 at the bottom of FIG. 6 is selected by the user operating the remote controller, the display control block 152 shifts the screen so as to display an at-a-glance table of a plurality of broadcast programs allocated to the broadcast time slot selected with the cursor 61 out of the program listing display spanning about one week. For example, as the picture following the shift, the display control block 152 gives an at-a-glance table of information about all broadcast programs allocated to the broadcast time slot selected with the cursor 61, on a two-dimensional plane with its X axis representing physical channels and its Y axis denoting broadcast times.

In a picture area 64 of FIG. 6, picture data 64a and 64b in a plurality of thumbnails are shown overlaid with one another, which the user may have difficulty distinguishing. This type of display may be replaced by a variation of the display example of FIG. 6, as shown in FIG. 7. When one of the picture data 64a and 64b in the picture area 64 is selected with the cursor 61 in FIG. 7, the selecting operation turns the picture data 64a and 64b shown overlaid in the picture area 65 at the center of FIG. 7 into corresponding picture data 65a and 65*b* shown side by side. The display control block 152 further allows a cursor 65*c* to select one of the picture data 65*a* and 65*b* shown parallelly in the picture area 65. When the picture data 65*b* is selected with the cursor 65*c*, additional information about the selected picture data 65*b* is displayed in detail as content information 65*d* at the bottom of the picture area 65. In this manner, the display control block 152 circumvents the mode of display in which the picture data in a plurality of thumbnails are shown overlaid with one another and are not easy to distinguish one from another from the user's point of view.

Figure 7:
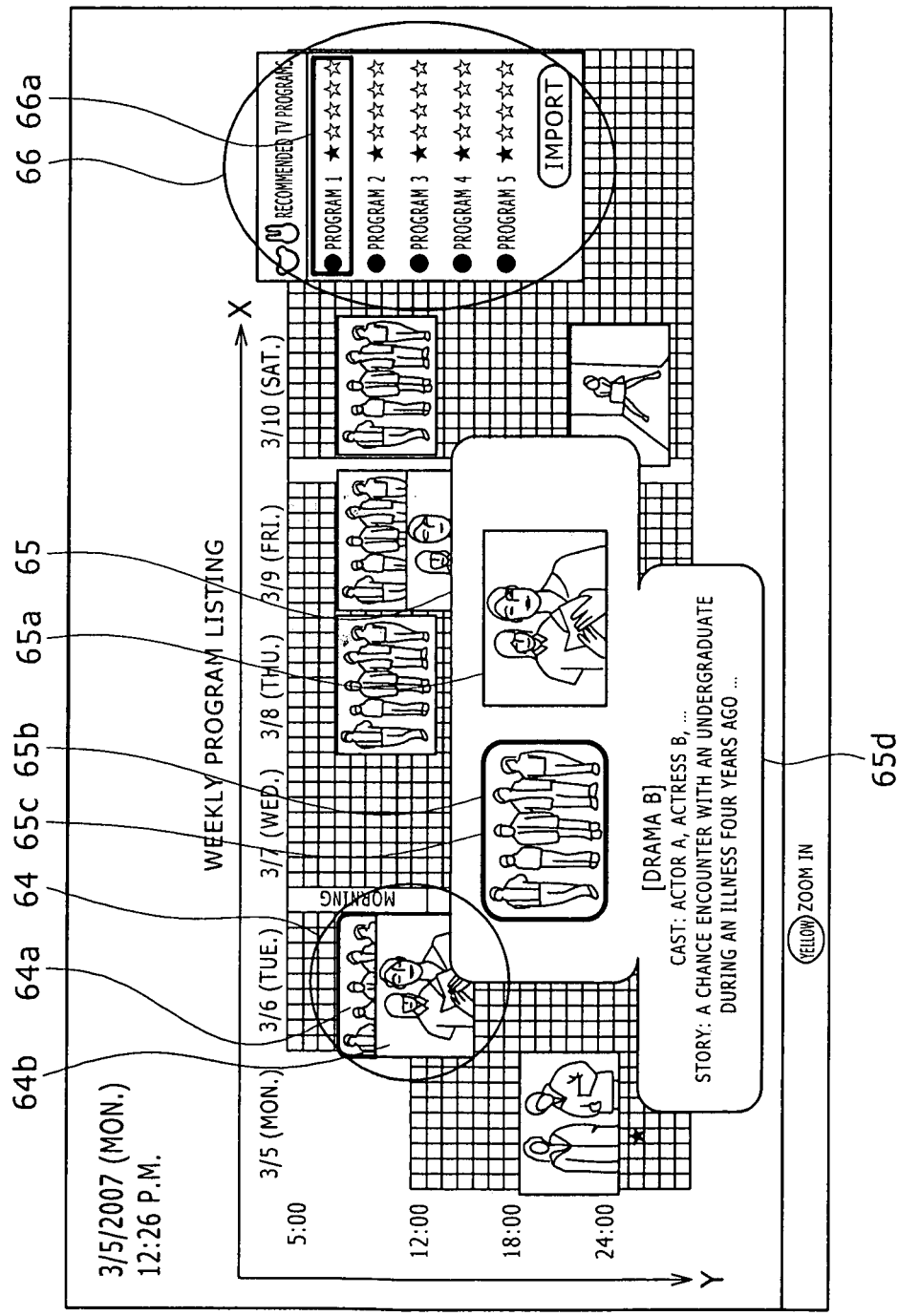
FIG. 7 is another schematic view showing the second display example of the program listing picture.

Furthermore, out of the program information shown in parallel with the content information 66 in the rightmost position of FIG. 7, the display control block 152 may give a pop-up display of the program information in enlarged form at the center of the screen in response to the selecting operation made with a cursor 66*a*.

Figure 8:
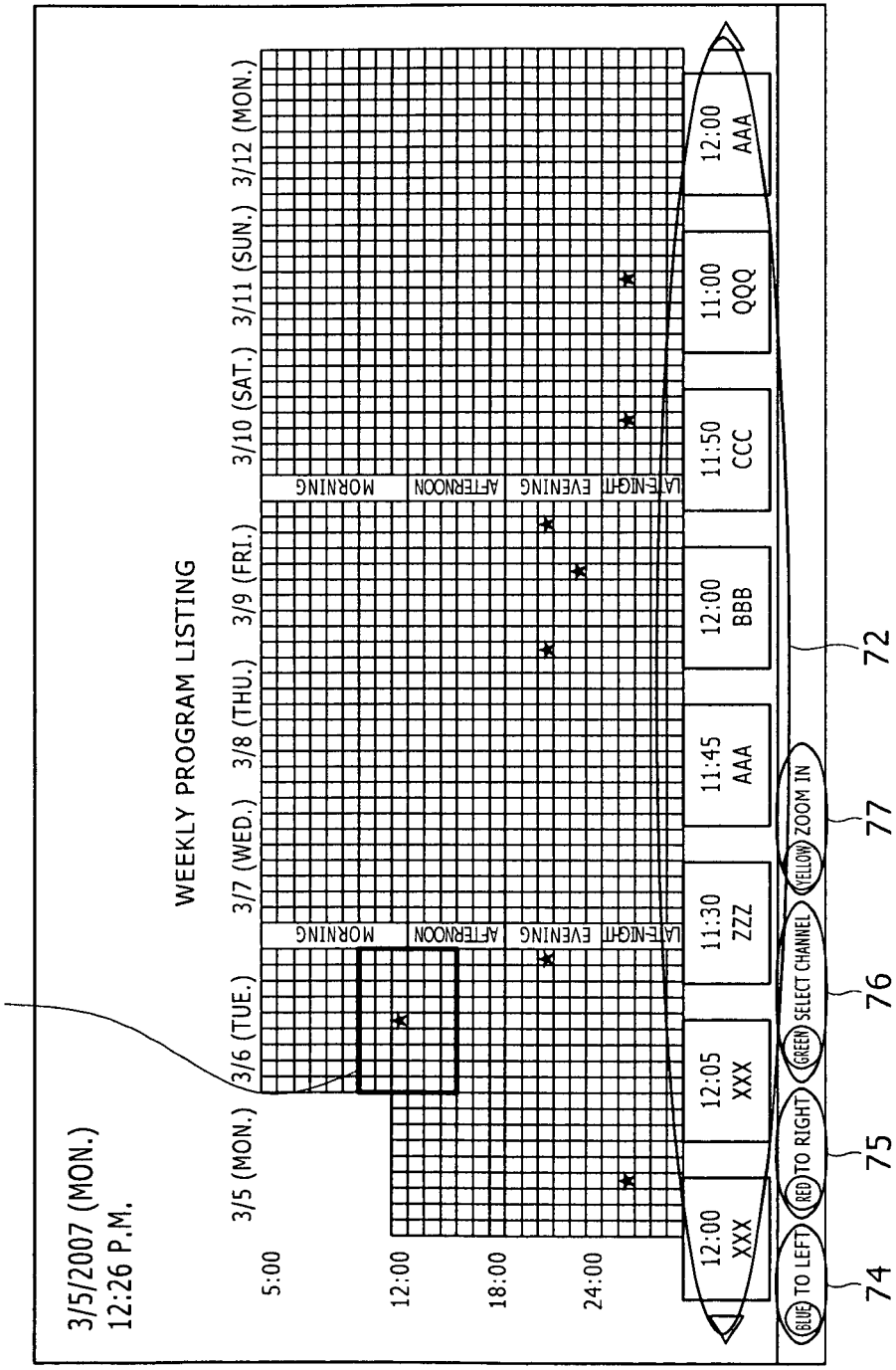
FIG. 8 is a schematic view showing a third display example of the program listing picture.
Figure 9:
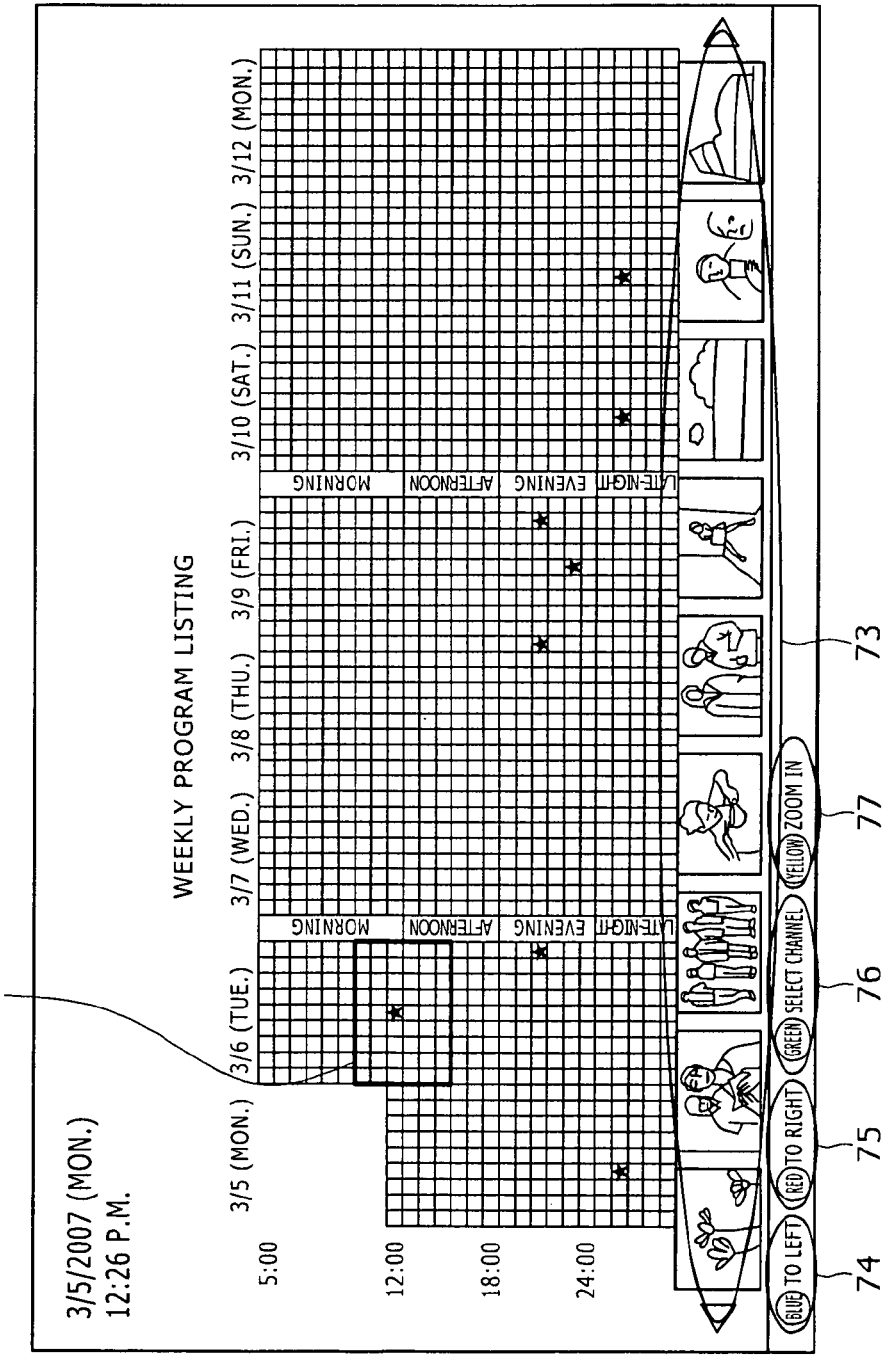
FIG. 9 is another schematic view showing the third display example of the program listing picture.

The workings of the control section 15 are further explained below in reference to the third display example shown in FIGS. 8 and 9. In the third display example, as in the first and the second display examples discussed above, the display control block 152 retrieves from the program listing picture storage block 151 the program listing picture in which are disposed program time slots on a two-dimensional plane with one axis representing broadcast dates and with the other axis denoting broadcast times, the retrieved program listing picture being displayed as a background picture.

In the third display example, as in the first and the second, the display control block 152 displays icons each identifying the coordinates of each of the broadcast programs in a given program list.

Also, in response to the user's operations, the display control block 152 displays a cursor 71 for selecting a given program time slot disposed in the program listing picture. In keeping with the movement of the cursor 71, the display control block 152 displays, illustratively at the bottom of FIG. 8, content information 72 regarding the programs contained in the broadcast time slot selected with the cursor 71. The content information 72 shown at the bottom of FIG. 8 is program information which is obtained from the broadcast waves held in the broadcast data storage block 155 and which illustratively includes broadcast channels, broadcast start times, and program titles. The diverse items of program information making up the content information 72 are arrayed illustratively in relation to corresponding physical channels. The display control block 152 may display the diverse items of program information constituting the content information 72 in different colors distinguishing different types of programs. This provides an operating environment enabling the user to find desired programs easily.

It is thus possible to provide the user with the content information using solely the broadcast data acquired from broadcast waves as described above. Alternatively, as in the first and the second display examples, the content data acquired from the content server may be displayed in thumbnails as shown in FIG. 9. Specifically, the display control block 152 displays at the bottom of FIG. 9 content information 73 composed of the picture data regarding the programs contained in the broadcast time slot selected with the cursor 71 as shown in FIG. 9. Also, the items of picture data regarding the programs making up the content information 73 are arrayed illustratively in relation to corresponding physical channels.

Furthermore, the display control block 152 may change the display of different items of program information corresponding to the broadcast channels constituting the content information 72 and 73, by scrolling the thumbnails of the program information in page-feed fashion in response to the user operating the remote controller illustratively to manipulate the color keys shown in function display fields 74 through 77. When the blue color key is selected by the user's operation on the function display field 74, the display control block 152 scrolls leftward the items of program information arrayed in relation to the corresponding broadcast channels constituting the content information 72 and 73. When the red color key is selected by the user's operation on the function display field 75, the display control block 152 scrolls rightward the items of program information arrayed in relation to the corresponding broadcast channels constituting the content information 72 and 73. When the green color key is selected by the user's operation on the function display field 76, the display control block 152 permits selection of broadcast channels. When the yellow color key is selected by the user's operation on the function display field 77, the display control block 152 shifts the screen so as to give an at-a-glance display of a plurality of broadcast programs allocated to the broadcast time slot selected with the cursor 71 out of the program listing display spanning about one week.

In the control section 15 structured as discussed above, the display control block 152 displays a program listing picture in which are disposed program time slots to which a plurality of broadcast programs are allocated in the two-dimensional coordinates defined with one axis representing broadcast dates. This provides the user with a bird's-eye-view display of program information over an extended time period on one screen. Also, instead of providing the program information about all programs allocated to a given program time slot, the display control block 152 exercises control so as to display on the display device the additional information added to the program time slot to which is allocated the program identified by program identification information. This makes it possible to reduce the amount of workload to be done and the time to be spent by the user looking for desired program information while giving a bird's-eye-view of program information over an extended period of time. In this manner, the display control block 152 provides a program listing display enabling the user easily to find desired program information while ensuring the bird's-eye visibility of program information over the prolonged time period such as several days on a single screen.

Also in the control section 15, the display control block 152 displays as a background picture the program listing picture stored in the program listing picture storage block 151 and, against this background, displays the display content and operation functions of a given program list in flexible and easily expandable fashion in accordance with the widgets input through the widget input block 153, as in the above-described first through the third display examples. In other words, the control section 15 offers various expanded functions in accordance with the control information represented by externally acquired widgets, illustratively without setting up beforehand a picture area in which to display program titles and the like on the program listing picture.

As an application of the functionality implemented by widgets, the control section 15 permits display control of a program search result screen illustratively in conjunction with control over the program listing display. This search function is brought about as follows: when keywords or other search conditions are input through the operation input section 16, the information acquisition block 154 of the control section 15 searches the broadcast data storage block 155 or the content server for the program information based on the search conditions, thereby obtaining a program list and content data. The information acquisition block 154 of the control section 15 then displays the program list and content data acquired by the information acquisition block 154 through the search process, in relation to the program time slots of the program listing picture.

By permitting display control of the program listing picture in keeping with the search process, the control section 15 can indicate the result of the search at least in relation to the program time slot defined with one of its coordinate axes representing broadcast dates. Thus instead of merely displaying program information in list form, the control section 15 provides the user with a bird's-eye-view display of the result of the search for a time period of several days. As a result, the user can easily recognize the programs corresponding to the result of the search.

As a second application, the control section 15 may display information about the contents recorded by a recording device such as a hard disk drive connected to the television receiver 1, in relation to a program listing picture indicating past broadcast times. Specifically, the display control block 152 of the control section 15 exercises control so as to display the past recording times regarding the recorded contents in relation to the program time slots disposed in the program listing picture. For example, the display control block 152 displays in thumbnails the picture data recorded on the recording device in relation to corresponding program time slots, or displays the content data acquired via widgets in relation to corresponding program time slots. In particular, when contents are recorded by a recording device capable of recording broadcast programs according to the user's preferences, picture information about the recorded contents may be displayed in thumbnails in relation to the program listing picture. This allows the user to have a bird's-eye-view of a list of programs that were recorded unintentionally in order to find preferred programs easily.

By exercising display control over the program listing picture in the manner described above, the control section 15 can display the result of the search at least in relation to the program time slot defined with one of its coordinate axes representing broadcast dates. Thus instead of merely displaying program information in list form, the control section 15 provides the user with a bird's-eye-view display of the result of the search for a time period of several days. As a result, the user is offered an operating environment in which to find easily the contents recorded on the recording device based on past recording times.

It should be understood by those skilled in the art that various modifications, combinations, sub-combinations and alternations may occur depending on design requirements and other factors insofar as they are within the scope of the appended claims or the equivalent thereof.

What is claimed is:

1. A program listing display control apparatus, comprising:
a processing device configured to:
store, in two-dimensional coordinates defined by two coordinate axes, a program listing picture in which program time slots during which a plurality of broadcast programs to be broadcast are arranged along one coordinate axis, and a plurality of program dates on which said broadcast programs are to be broadcast are arranged along another coordinate axis;
control a display apparatus to display said program listing picture as a two-dimensional grid of framed regions defined by the two coordinate axes and corresponding, respectively, to the program time slots,
in which each of only those framed regions of the framed regions to which at least one of the broadcast programs correspond is displayed with a shaped mark corresponding to the at least one of the broadcast programs, wherein the broadcast programs are from a plurality of program lists associated with respective different shaped marks that are displayed as the shaped marks respectively in said those framed regions;
input control information for controlling the acquisition of additional information to be added to said program listing picture; and
acquire program identification information for identifying the programs to which said additional information is added and the additional information regarding the programs identified by said program identification information, based on the control information; and
exercise control of the display apparatus to display a user selection by movably highlighting an area within the two-dimensional grid, in which the highlighted area has a length including at least two adjacent framed regions in their entirety along one of the two coordinate axes or a width including at least two adjacent framed regions in their entirety along another of the two coordinate axes such that, in response to at least one of the framed regions corresponding to the programs identified by said program identification information being selected, the additional information corresponding to the selected program is displayed by said display apparatus as a pop-up covering at least part of the two-dimensional grid of the program listing picture.

2. The program listing display control apparatus according to claim 1, wherein said broadcast programs are broadcast in a manner allocated to broadcast channels based either on broadcast frequencies or on program types; and the one of said two coordinate axes representative of said plurality of broadcast dates at which said broadcast programs are to be broadcast or the other coordinate axis representative of the broadcast times at which said broadcast programs are to be broadcast is further divided among said broadcast channels on which said broadcast programs are to be broadcast.

3. The program listing display control apparatus according to claim 2, wherein the one of said two coordinate axes represents said plurality of broadcast dates and said broadcast channels associated with each of said plurality of broadcast dates, and the other of said two coordinate axes denotes the broadcast times.

4. The program listing display control apparatus according to claim 3, wherein said processing device is configured to:
acquire as said program identification information the information for identifying the broadcast times of the programs to which said additional information is added;
acquire as said additional information picture information for at least one of the programs identified by said program identification information; and
exercise control such that when the additional information corresponding to the selected at least one of the programs includes the picture information, the picture information is displayed on said display apparatus in the pop-up covering the at least part of the two-dimensional grid of the program listing picture.

5. The program listing display control apparatus according to claim 1, wherein said processing device is configured to:
acquire, from the control information the program identification information for identifying the programs to which said additional information is added and the additional information regarding the programs identified by said program identification information, based on the control information selectively input by a user.

6. The program listing display control apparatus according to claim 1, wherein: said broadcast programs are broadcast using a broadcast signal including program information about the broadcast programs in question; and said processing device is configured to acquire said program identification information and the additional information regarding the programs identified by said program identification information, by extracting the program information from said broadcast signal based on the control information.

7. The program listing display control apparatus according to claim 1, wherein said processing device is configured to acquire via a telecommunication line said program identification information and the additional information regarding the programs identified by said program identification information, based on the control information.

8. The program listing display control apparatus according to claim 1, wherein said those frame regions include a single shaped mark as an icon.

9. The program listing display control apparatus according to claim 1, wherein each of the framed regions to which any of the broadcast programs does not correspond is displayed unoccupied.

10. A program listing display control method, comprising: controlling, by a processing device:
displaying on a display apparatus a program listing picture retrieved from a program listing picture storage configured to store, in two-dimensional coordinates defined by two coordinate axes, said program listing picture in which program time slots during which a plurality of broadcast programs to be broadcast are arranged along one coordinate axis, and a plurality of program dates on which said broadcast programs are to be broadcast are arranged along another coordinate axis, the program listing picture displaying as a two-dimensional grid of framed regions defined by the two coordinate axes and corresponding, respectively, to the program time slots,
in which each of only those framed regions of the framed regions to which at least one of the broadcast programs correspond is displayed with a shaped mark corresponding to the at least one of the broadcast programs, wherein the broadcast programs are from a plurality of program lists associated with respective different shaped marks that are displayed as the shaped marks respectively in said those framed regions;
inputting control information for controlling the acquisition of additional information to be added to said program listing picture;
acquiring program identification information for identifying the programs to which said additional information is added and the additional information regarding the programs identified by said program identification information, based on the control information; and
exercising control of the display apparatus to display a user selection by movably highlighting an area within the two-dimensional grid, in which the highlighted area has a length including at least two adjacent framed regions in their entirety along one of the two coordinate axes or a width including at least two adjacent framed regions in their entirety along another of the two coordinate axes such that, in response to at least one of the framed regions corresponding to the programs identified by said program identification information being selected, the additional information corresponding to the selected program is displayed by said display apparatus as a pop-up covering at least part of the two-dimensional grid of the program listing picture.

11. The program listing display control method according to claim 10, wherein the broadcast programs are broadcast in a manner allocated to broadcast channels based either on broadcast frequencies or on program types; and the one of the two coordinate axes being representative of the plurality of broadcast dates at which the broadcast programs are to be broadcast or the other coordinate axis at which the broadcast programs are to be broadcast is further divided among the broadcast channels on which the broadcast programs are to be broadcast.

12. The program listing display control method according to claim 11, wherein the one of the two coordinate axes represents the plurality of broadcast dates and the broadcast channels associated with each of the plurality of broadcast dates, and the other of the two coordinate axes denotes the broadcast times.

13. The program listing display control method according to claim 10, wherein said those framed regions include a single shaped mark as an icon.

14. The program listing display control method according to claim 10, wherein each of the framed regions to which any of the broadcast programs does not correspond is displayed unoccupied.

15. The program listing display control method according to claim 12, further comprising: controlling, by the processing device:
acquiring as the program identification information the information for identifying the broadcast times of the programs to which said additional information is added;
acquiring as the additional information picture information for at least one of the programs identified by said program identification information; and
exercising control such that when the additional information corresponding to the selected at least one of the programs includes the picture information, the picture information is displayed on the display apparatus in the pop-up covering the at least part of the two-dimensional grid of the program listing picture.

\* \* \* \* \*